July 5, 1966 A. J. TOBIAN ET AL 3,259,165
FLOATING NUT RETAINER ASSEMBLY
Filed July 14, 1964

INVENTORS
ALBERTO J. TOBIAN
PAUL HERNADI
BY
Greist, Lockwood, Greenawalt & Dewey
Attys.

United States Patent Office 3,259,165
Patented July 5, 1966

3,259,165
FLOATING NUT RETAINER ASSEMBLY
Alberto J. Tobian, Hayward, and Paul Hernadi, Torrance, Calif., assignors to VSI Corporation, Pasadena, Calif., a corporation of Illinois
Filed July 14, 1964, Ser. No. 382,607
4 Claims. (Cl. 151—41.76)

This invention relates to a floating nut retainer assembly and more particularly is directed to a new and improved method and structure for floatingly mounting a fastening member, such as a nut, on a retainer strip.

In aircraft, aerospace and related applications, structural parts are releasably held to enhance the ease of installation, assembly, inspection, repair or replacement of the members or parts so joined. Obviously, the speed of fastening is materially enhanced if one of the fasteners is mounted in such a manner so as to be held against rotation. It is also helpful if the mounted fastener is floatingly held to accommodate any mis-alignment between the parts so joined.

The present invention is particularly adapted to accomplish this objective in that a retainer strip such as an angle, channel or the like is provided which floatingly mounts a fastener such as a nut in a non-rotatable manner. An opening is provided through the retainer strip to admit the bolt member for co-operation with the nut. In the present invention, the nut is provided with a rectangular base portion which is laterally received under a pair of lugs punched out of one surface of the strip. A spring clip retainer co-operates with the lugs to restrain movement of the nut in one direction while suitable means is provided to restrain movement of the nut in the opposite direction, thereby floatingly confining the rectangular base portion between the lug members, which in turn serves to preclude rotation of the nut during insertion and withdrawal of the co-operating bolt.

The specific details and broad advantages of the present invention will be better comprehended upon a consideration of the objects to be achieved and the detailed description of the floating nut retainer assembly to follow.

It is an object of this invention to provide a new and improved floating retainer assembly of simplified construction which is particularly adapted to floatingly mount a flanged nut in a non-rotatable manner.

It is a further object of this invention to provide a new and improved retainer strip for floatingly mounting a nut in a non-rotatable manner which enhances the resistance to torsion without an increase in weight of the mounting.

It is a further object of this invention to provide a new and improved floating nut retainer which, due to its unique design, requires a minimum number of parts to floatingly mount a nut and hold the same in a non-rotatable manner.

It is a still further object of this invention to provide a new and improved manner of floatingly and non-rotatably mounting a fastener which serves to contribute to a reduction in the total weight of the retainer strip without detracting from the torsional strength of the non-rotatable mounting.

Further and fuller objects will become readily apparent when reference is made to the accompanying drawings wherein.

Figure 1:
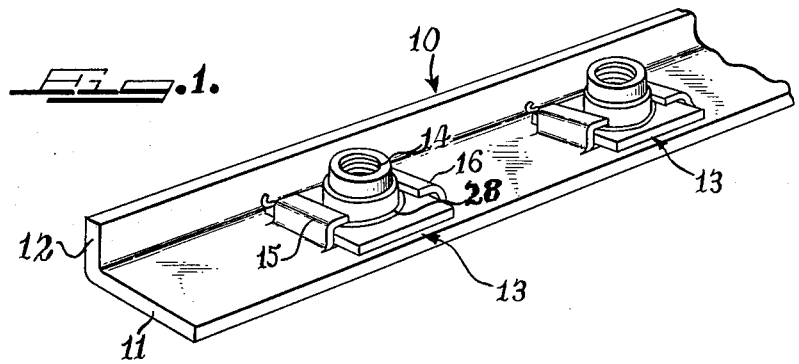
FIG. 1 is a fragmentary perspective view of the floating nut retainer strip of the present invention illustrating a pair of retainer assemblies.

Referring now to FIG. 1, reference character 10 generally denotes an angle strip having the usual leg portions 11 and 12. Obviously, the invention is usable with other strip configurations such as channels, I beams, and the like. The angle strip 10 may be of any desired length and may be used in any particular fastening application including forming a part of the structural framework of an aircraft or the like. Another use which is contemplated is to support hydraulic and electrical lines at spaced intervals within the aircraft.

The floating nut retainer assembly of the present invention is indicated generally at 13 with each of the retainer assemblies being of identical construction and spaced apart any desired distance on the strip 10. If desired, the angle strip 10 may be relieved between retainer assemblies to any desired degree so long as it does not interfere with the torsional resistance provided by the retainer assemblies.

The retainer assembly 13 generally includes a flanged nut member 14 which is received and floatingly confined between lugs 15 and 16 integrally formed on the strip 10. A retainer spring 28 cooperates with the lugs 15 and 16 to maintain the flanged nut 14 in floating engagement therewith. Lugs 15 and 16 and the leg portion 12 of the angle 10 serve to preclude rotation of the flanged nut 14.

Figure 2:
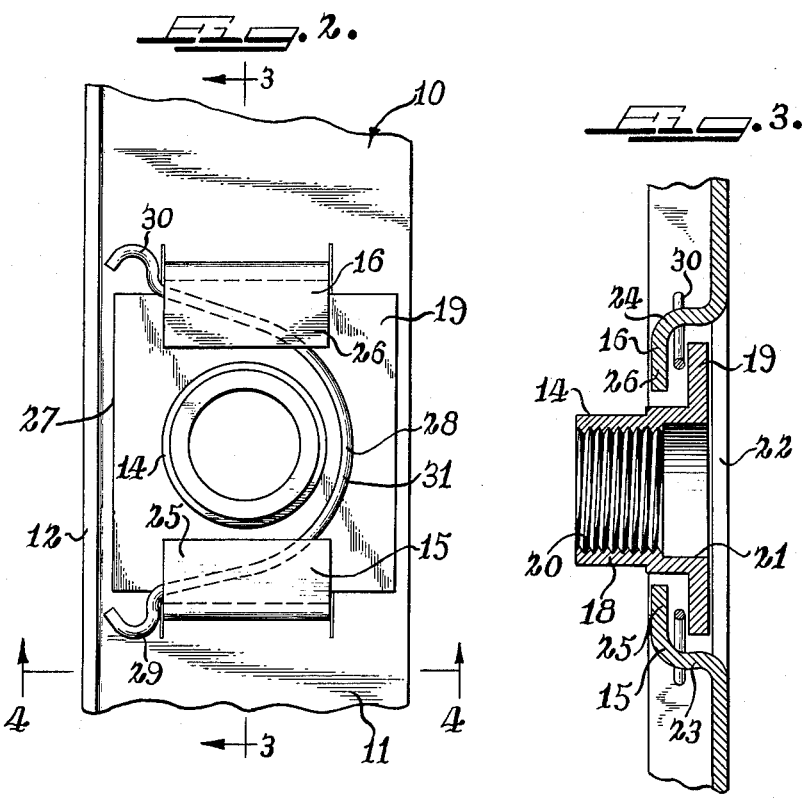
FIG. 2 is an enlarged top plan view of one of the floating nut retainer assemblies shown in FIG. 1.
Figure 3:
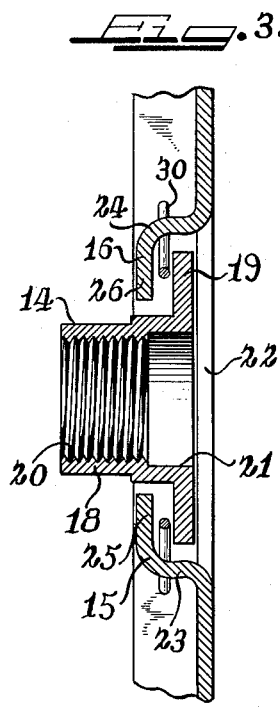
FIG. 3 is a cross sectional view taken along the lines 3—3 of FIG. 2.
Figure 4:
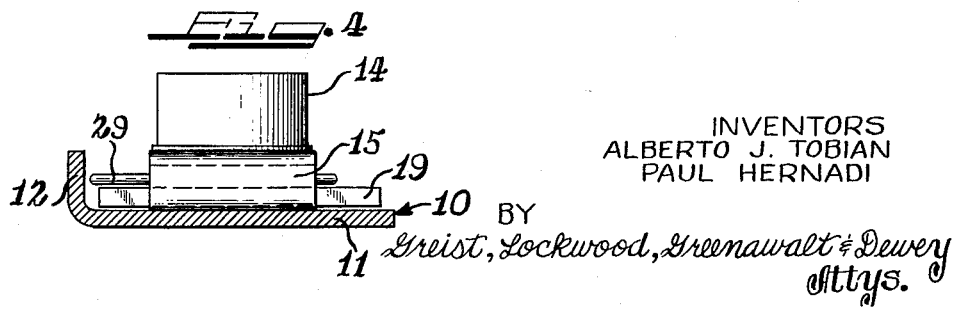
FIG. 4 is a cross sectional view taken generally along the lines 4—4 of FIG. 2.

The specific relationship of the elements broadly identified above will be better understood upon reference to the enlarged views of FIGS. 2–4. The flanged nut 14 includes a tubular barrel portion 18 which projects upwardly from a flat base portion 19 of generally rectangular configuration, and is disposed between the lugs 15 and 16. Internal threads 20 are provided in the tubular barrel portion adjacent an enlarged lead-in portion 21. Obviously, the threads 20 may be formed continuously through the base 19 if the lead-in portion 21 is omitted.

The angle strip 10 is provided with an opening 22 which is formed by punching out or in forming the lugs 15 and 16. The opening 22 may be of any desired shape limited of course by the shape of the lugs. It is contemplated that it may be round at the center to accommodate floating of the flanged nut 14 while providing clearance for the cooperating bolt. Each of the lugs 15 and 16 is provided with an upstanding portion 23 and 24 and an inwardly projecting flange portion forming retainer flanges 25 and 26 respectively. The retainer flanges 25 and 26 on the lugs 15 and 16 serve to maintain the flanged nut non-rotatably held on the strip 10 in close proximity to the leg portion 11 of the angle 10 and are resistant to torsional forces applied to the flange nut.

The inside marginal edge 27 of the base 19 on the flanged nut 14 is disposed in close proximity to the leg portion 12 of the angle 10. This serves to limit the total lateral movement of the flanged nut 14 toward the leg 12 while a spring retainer clip 28 restrains movement in the opposite direction. Limited movement longitudinally of the angle strip, and laterally towards the leg 12 and the spring clip 28 is also permissible to accommodate any mis-alignment of openings or fastening members.

The spring retainer 28 is formed with hooked ends 29 and 30 which in plan view generally resembles the Greek letter Omega. The hooked end portions 29 and 30 are disposed between the upstanding portion 23 and 24 on each of the lugs 15 and 16 respectively and the leg 12 of the angle.

As is evident in FIG. 2, the main body or U-shaped portion 31 of the spring retainer 28 (between the hooked ends 29 and 30) passes beneath the retainer flanges 25 and 26 of the lugs 15 and 16 to assist in maintaining the spring in place. Accordingly, the main body portion 31 is engageable by the upstanding tubular portion 18 to limit the lateral movement of the flanged nut away from the leg 12 of the angle 10.

Assembly of the flanged nut 14 to the strip 10 is quickly and easily accomplished by laterally inserting the base 19 between the lugs 15 and 16. The nut 14 is held on the strip 10 interlocked with the lugs 15 and 16 by placing the retainer spring 28 in engagement with the lugs 15 and 16 in the manner shown in FIG. 2. This permits slight floating movement while positively restraining the flanged nut against rotation.

The use of lugs 15 and 16 which are punched out of the strip 10 maintains the total volume of material of the retainer strip at minimum, as a consequence the total weight also. The retainer strip 10 may be held in place by fasteners in the legs 11 or 12 or alternatively may be retained by the bolts which co-operate with each of the retainer assemblies 13. Should the flanged nut 14 become damaged in any way, it may be conveniently replaced. Additionally, flanged nuts having different thread sizes may be readily inserted to accommodate any desired fastening application.

Upon a consideration of the foregoing, it will become obvious to those skilled in the art that various modifications may be made without departing from the invention embodied herein. For example, the fastening arrangement is applicable to a bolt as well as a nut, as is obvious by merely considering base 19 to be the head and the barrel portion 18 to be the shank which would be externally threaded. It is to be understood that this construction is encompassed within the terminology flanged nut. Other changes of like kind and quality may be made and therefore, any limitations imposed are intended to be within the spirit and scope of the appended claims.

We claim:

1. A floating nut retainer assembly comprising an angle strip, said angle strip having a pair of lugs formed by punching out an opening in a generally planar portion thereof, said opening being of sufficient dimension to allow passage of a fastener, each of said lugs having a portion thereof projecting towards the center of said opening above the surface of said strip to form a retainer flange, a flanged nut member having a flat base portion and an upstanding barrel portion, a threaded bore in said barrel portion adapted to receive a threaded fastener, said flat base portion being inserted laterally between an upwardly projecting portion of said lugs beneath said retainer flanges, an upstanding leg portion on said angle strip adjacent said lugs to limit the lateral insertion, said flat base being finally disposed with an edge portion thereof closely spaced from said upstanding leg on said strip, and spring retainer means positioned beneath the retainer flanges of each of said lugs, means formed on said spring retainer means to maintain said spring retainer means positioned beneath said retainer flanges thereby to limit the lateral movement of said nut away from said upstanding leg thereby to maintain the threaded bore in said nut floatingly positioned over said opening.

2. The floating nut retainer assembly of claim 1 wherein said spring retainer means comprises a generally U-shaped spring and said means formed on said spring retainer means to maintain said spring retainer means positioned beneath said flanges includes having a hook-shaped terminal portion of each leg positioned between said lugs and said upstanding leg on said strip.

3. A retainer assembly for floatingly retaining a fastener comprising a strip having a generally planar and longitudinally extending surface, at least one pair of lugs formed by punching out an opening in said planar surface, each of said lugs having an upstanding portion and a retainer flange portion, each of said retainer flange portions being directed towards the center of said opening and spaced from said longitudinally extending planar surface, a fastener member having a flat base portion and an upstanding barrel portion, said flat base portion being positioned between said lugs beneath said retainer flanges and said barrel portion being disposed between said lugs, an upstanding leg portion on one side of said opening to limit the movement of said base laterally of said opening in one direction, and spring retainer means positioned beneath the retainer flange of each of said lugs, said spring retainer means having means formed thereon to maintain said spring retainer means positioned beneath the retainer flange thereby to limit lateral movement of said fastener away from said upstanding leg.

4. The retainer assembly of claim 3 wherein said means formed on said spring retainer means to maintain said spring retainer means positioned beneath said flanges comprises hook-shaped portions engageable with said upstanding portion of said lug.

References Cited by the Examiner
UNITED STATES PATENTS

| | | | |
|---|---|---|---|
| 1,272,919 | 7/1918 | Crawford | 151—41.74 |
| 2,144,553 | 1/1939 | Simmonds | 151—41.76 |
| 2,304,107 | 12/1942 | Leisure | 151—41.76 |
| 2,477,429 | 7/1949 | Swanstrom et al. | 151—41.76 |

FOREIGN PATENTS

| | | |
|---|---|---|
| 52,144 | 4/1943 | France. |

CARL W. TOMLIN, *Primary Examiner.*

M. PARSONS, JR., *Assistant Examiner.*